(12) United States Patent
Braught

(10) Patent No.: US 9,212,072 B2
(45) Date of Patent: Dec. 15, 2015

(54) APPARATUS FOR CREATING A VORTEX SYSTEM

(76) Inventor: Lynell Braught, White Sulphur Springs, WV (US)

( * ) Notice: Subject to any disclaimer, the term of this patent is extended or adjusted under 35 U.S.C. 154(b) by 660 days.

(21) Appl. No.: 13/272,401

(22) Filed: Oct. 13, 2011

(65) Prior Publication Data

US 2013/0092544 A1   Apr. 18, 2013

(51) Int. Cl.
 *C02F 1/48* (2006.01)
 *C02F 1/50* (2006.01)

(52) U.S. Cl.
 CPC .............. *C02F 1/485* (2013.01); *C02F 1/505* (2013.01); *C02F 2201/483* (2013.01); *C02F 2303/04* (2013.01); *C02F 2303/22* (2013.01)

(58) Field of Classification Search
 CPC ....................................................... C02F 1/485
 USPC ................................................. 204/660, 664
 See application file for complete search history.

(56) References Cited

U.S. PATENT DOCUMENTS

| | | | |
|---|---|---|---|
| 3,710,067 A * | 1/1973 | Ullmann et al. | 219/69.13 |
| 4,828,015 A * | 5/1989 | Takeuchi et al. | 164/461 |
| 5,238,558 A * | 8/1993 | Curtis | 204/664 |
| 5,755,970 A * | 5/1998 | Fourqurean et al. | 210/695 |
| 7,351,341 B2 * | 4/2008 | Tsuboi et al. | 210/695 |
| 7,407,589 B2 * | 8/2008 | Holland | 210/695 |
| 8,477,003 B2 * | 7/2013 | Wilson et al. | 335/296 |
| 2010/0236938 A1 | 9/2010 | Braught | |

OTHER PUBLICATIONS

University of Arizona Phys 251 Laboratory, "Crystal Radios and LRC Circuits—1", http://www.physics.arizona.edu/physics/gdresources/documents/P_251_Ex_11.pdf.*

* cited by examiner

*Primary Examiner* — Bryan D. Ripa

(57) ABSTRACT

An apparatus delivering multi-vibrational, frequency-based, electromagnetic fields, which are independent but may work simultaneously. The apparatus may be used in many applications, especially in industrial applications such as cooling towers and related pipes and plumbing. The apparatus ELIMINATES calcium based hard water deposits and PROHIBITS bacteria build-up in cooling towers. The apparatus will help reduce soap usage in industrial laundry, reduce salt usage in water softeners, reduce chemical use in pools, inhibit algae growth and increase water clarity. The apparatus will restructure calcium carbonate and other mineral deposits to prevent mineral buildup. The apparatus may be formed from a plurality of wire-wrapped rods staggered around a pipe and connected to a power supply. The plurality of rods may be encased in flexible coating, wrapped in appropriate fabric, or encased in metal outer covering. As a result, waste water is reduced, water costs is kept low, and water is conserved.

14 Claims, 22 Drawing Sheets

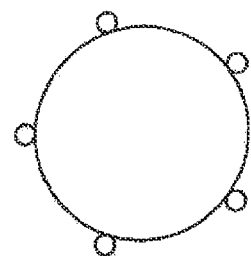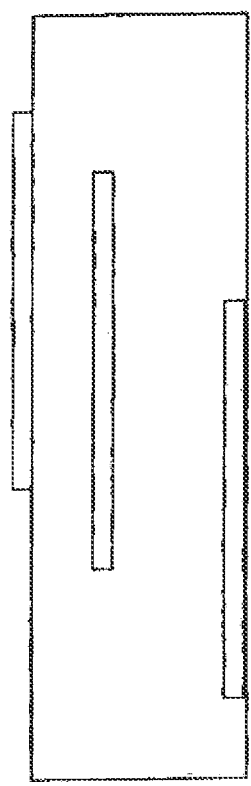
FIG. 18

APPARATUS FOR CREATING A VORTEX SYSTEM

FIELD OF THE INVENTION

The present invention relates generally to an apparatus that is a high performance, economical treatment created for industrial uses, especially, but not limited to, cooling towers, steam heaters, boilers, waste water treatment and water purification. Environmental requirements and mandates are changing and becoming extremely stringent. This new apparatus allows for affordable compliance. The apparatus offers a unique design that creates a high performance, staggered rod construction, based on a naturally occurring vortex system that intensifies the multiple vibrational and magnetic high frequency fields that may/can change the molecular structure of liquids, in particular water.

BACKGROUND OF THE INVENTION

While testing reactions related to Patent Pending Title: FUEL ADDITIVE APPARATUS, SYSTEM AND METHOD (US patent publication 20100236938A1) a coated copper wire was wrapped in a coil configuration on a steel rod. This coated copper wire wrapped around the steel rod in the coil configuration was used to create a magnetic field for the use of helping to separate water molecules using electrolysis. A significant increase in the amount of gas produced was noted. This discovery led to continued research, testing, and development and design of the industrial apparatus for cooling towers, steam heaters, boilers, waste water treatment and water purification.

Magnetic fields have been used in various applications, such as removal of scale buildup within a liquid environment with limited success. The use of magnetic fields in industrial cooling towers, steam heaters, boilers, waste water treatment and water purification has had a very low success rate. A conventional electromagnetic water treatment apparatus may include an electro-magnetic field to prevent the occurrence and attachment of scale and rust along a pipe or channel used for the circulation of water or liquids. The presently available electromagnetic water treatment devices are designed so that a pair of permanent magnets and/or a pair of electrodes, composed of different metals, are attached to a casing, either affecting only the center of the magnetic field or using only one or two crosscuts of magnetism to affect the water. The entire device is normally included as part of the water passage or channel. According to the principle incorporated into these conventional devices, there may be a magnetic field generated by permanent magnets and/or an electric field generated by a weak electrical current. These devices containing permanent magnets and/or electrical fields generated by a weak electrical current may create an electrical and/or magnetic field that can applied to water flowing through the water passage or channel which is defined by the casing and the permanent magnets and/or electrical fields.

As can be seen, there is an extreme need for an apparatus to generate a frequency based electromagnetic field that may be used in various applications, including industrial applications such as cooling towers, boilers, waste water treatment plants, water purification and the like. Environmental mandates are changing and this new technology allows for affordable compliance.

SUMMARY OF THE INVENTION

In one aspect of the present invention an apparatus comprises of a single or group of standard electromagnet magnetic coil/coils (FIG. 1) made up of coated magnetic wire wrapped around an uncoated cold rolled steel rod. The steel rod (13) may vary in diameter, which is determined by the magnetic field (14) and frequency (15) that is needed for the desired application. The number of wire layers of the coil (16) must be a minimum but not limited to two. The number of layers will be determined by the magnetic field depth and frequency needed. The number of rods may be determined by the number of magnetic field (14) cuts of the liquid that is needed to achieve the desired results. Each wire will be a continual smooth flow on the rod (17) with the next layer of wire being wound the opposite direction (16) and any additional wire will be wound in the same end to end fashion with the additional layers of wire being placed in a reverse direction of the previously coiled layer.

The bottom wire of the first rod is connected to a positive line (18) of a DC power supply; the top wire of the first rod (19) is connected to the bottom wire end of the adjacent rod; the last top wire (20) of the last rod is connected to the negative line of the DC power supply; the bottom end of the wire of the last rod is connected to the top end of the end of the adjacent rod (39); and each of the plurality of rods between the first rod and the last rod having the top and bottom ends of wire connected to the wire ends of each adjacent rod. Staggering the rods creates (FIG. 4) a vortex effect, which causes the field to crosscut the water many more times than the standard magnetic fields (FIG. 18) increasing the frequency (15) and magnetic (14) field. The staggering of the rods (FIG. 4) will increase the number of times the frequency (15) and the magnetic fields (14) will crosscut and react with the flowing liquid. This innovative process will cause a greater reaction within the flowing liquid that is being treated.

The innovative features, aspects and advantages of the present invention will become better understood with reference to the following drawings, descriptions and claims.

BRIEF DESCRIPTION OF THE DRAWINGS

FIG. 18 is a perspective view of the apparatus of FIG. 6 wrapped in a counter clockwise (may also be clockwise) direction around a plastic pipe (31) (FIG. 16), according to an embodiment of the present invention;

DETAILED DESCRIPTIONS OF THE INVENTION

The following detailed description is the most accurate and concise representation of the modes of achieving the exemplary embodiments of the invention. The description is not to be taken in a limiting sense, but is made for the purpose of illustrating the general principles of the invention, since the scope of the invention is best defined by the appended claims. Various innovative features are described below that can each be used independently or simultaneously or in conjunction with each other or in combination with other features.

Broadly, an embodiment of the present invention provides an apparatus that may deliver electrical (15, 29) and magnetic fields (14, 28), working independently or simultaneously or in conjunction with each other or in combination with other features. The electrical and magnetic fields may be used in many industrial applications, including, but not limited to the use of reducing the amount of water used in cooling towers. Also it may help by eliminating calcium and other mineral buildup, reducing bacteria and algae build-up in cooling towers, boilers, wastewater treatment plants, water purification and various industrial uses. In commercial and residential use it may reduce calcium and mineral buildup in pipes, reduce soap usage in laundry, reduce salt usage in water softeners, and reduce chlorine use in pools. The apparatus may inhibit algae growth, while increasing water clarity by restructuring or inhibiting molecular groupings, calcium salts and other minerals. The apparatus used with water may cause a change in the grouping or structuring of the water molecules, and thereby altering the surface tension of the water which may alter boiling and/or freezing temperatures. This restructuring may cause a difference when the water is used in relation to electrolysis.

Figure 1:
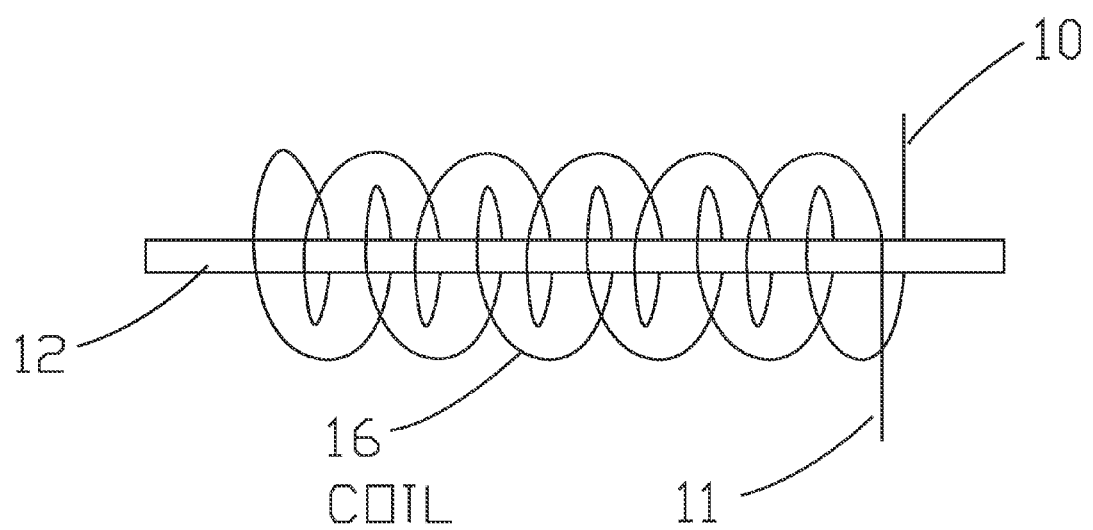
FIG. 1 is a side view of the uncoated rod (13) (FIG. 2) wrapped with wire of coil (16), according to an embodiment of the present invention.
Figure 9:
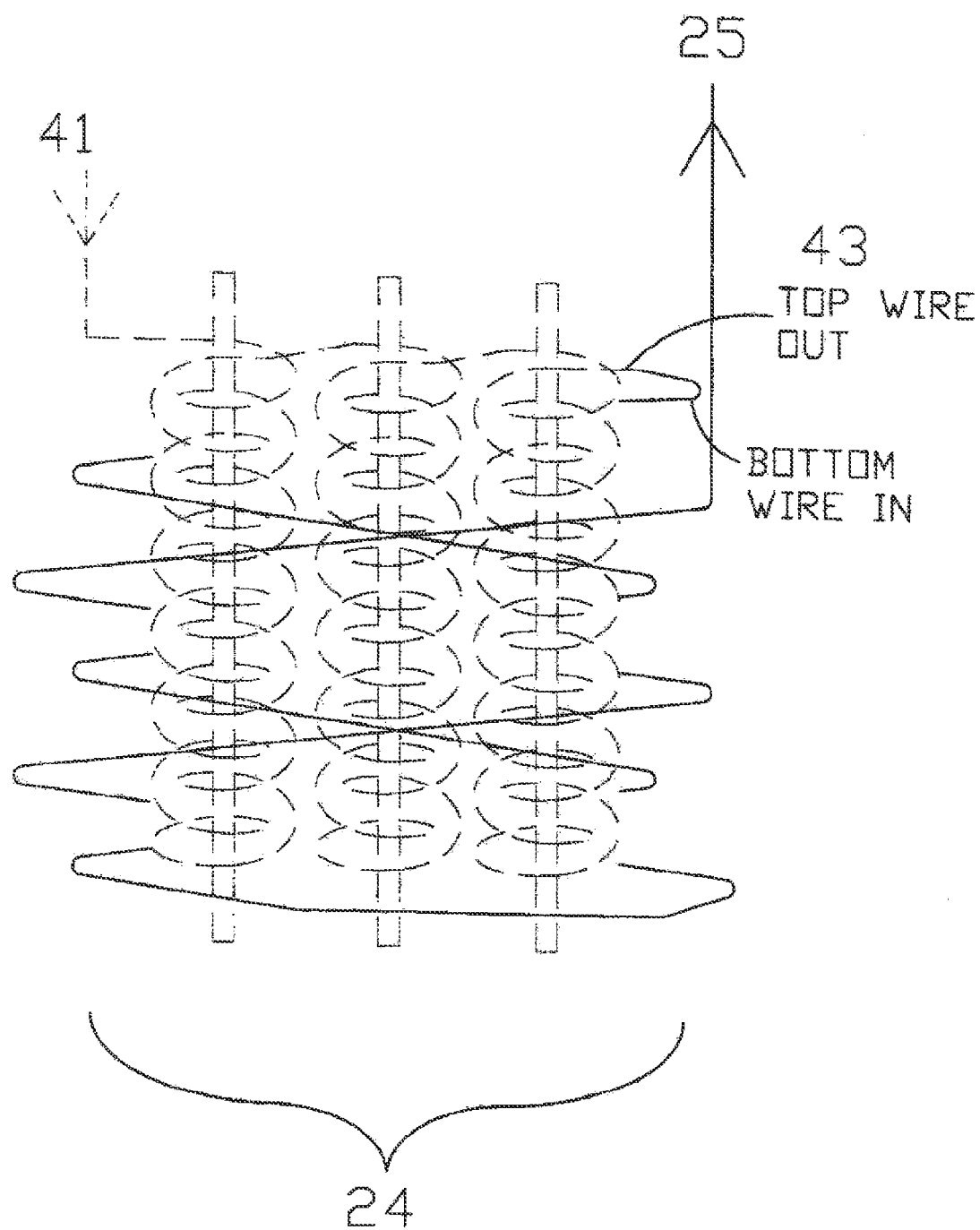
FIG. 9 is a view of three uncoated rods (13) (FIG. 2) stacked together with coils (23) (FIG. 8) wrapped around the three inner rods and the outer coil (24) wrapped around the three inner coils holding them all together as one unit with the connections made in a series (25) according to the embodiment of the present invention.
Figure 22:
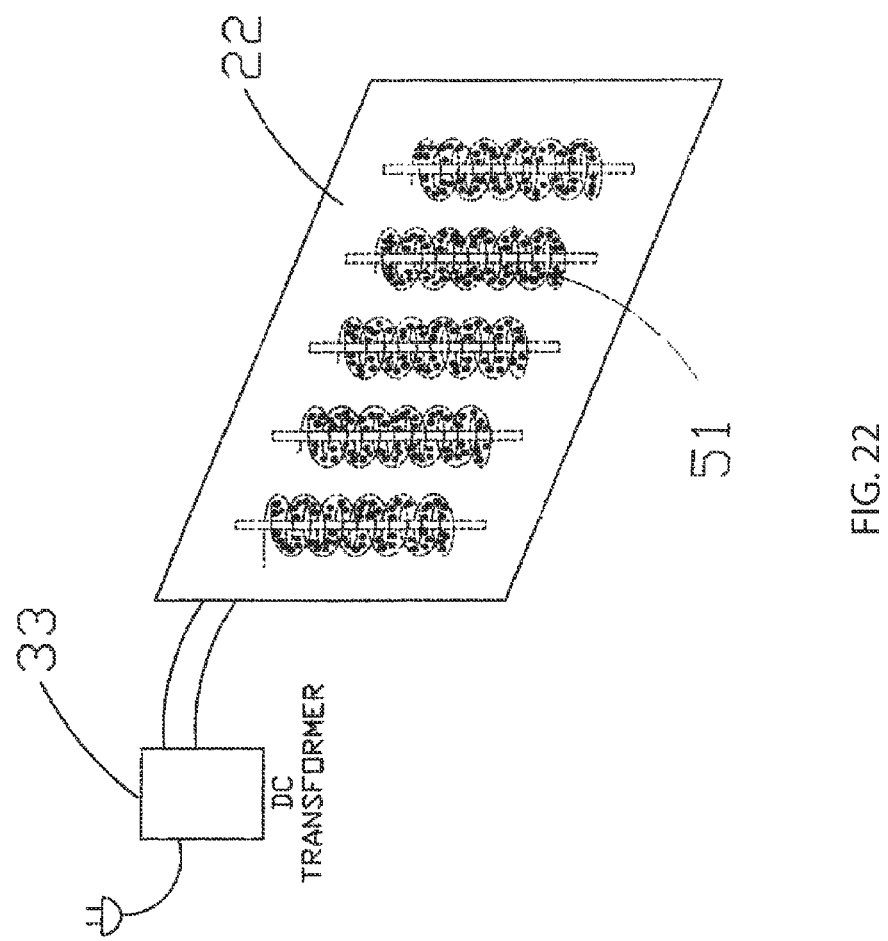
FIG. 22 is a perspective view of the apparatus with various crystals (51) either synthetic or natural, of varying shapes and sizes, attached to the perimeter of the coils shown as (16) in FIG. 1, according to the embodiment of the present invention.

In an exemplary embodiment, the apparatus may be formed from a plurality of wire-wrapped (FIG. 1) uncoated rods (FIG. 4, FIG. 9) with assorted crystal coating (FIG. 22) (51) connected to a DC power supply (33). The plurality of rods may be enclosed in flexible epoxy (22) or other suitable coating, and then wrapped in a fabric (30) or metal (32) outer covering.

Figure 10:
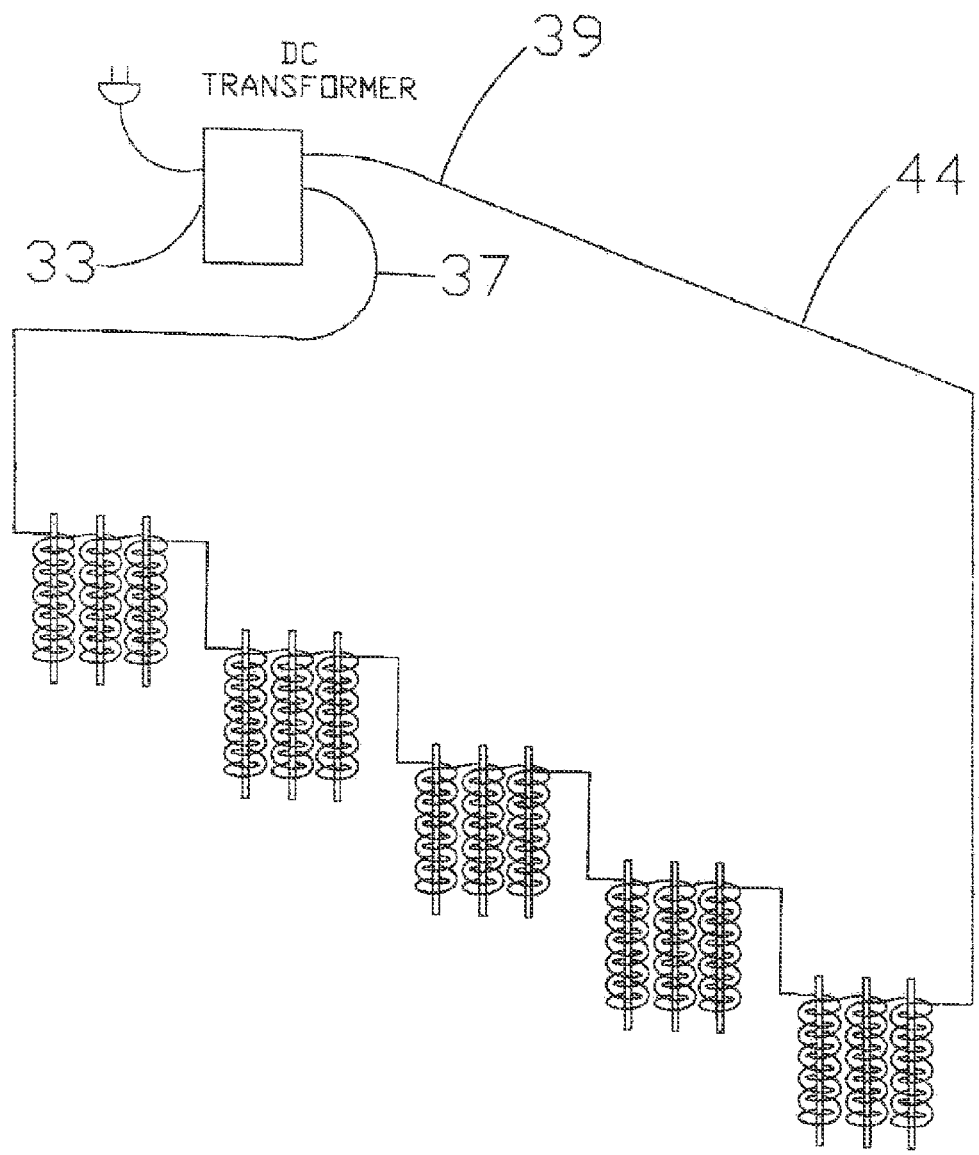
FIG. 10 is a perspective view of a plurality of staggered (24) (FIG. 9) wire-wrapped uncoated rods of FIG. 9, connected in series (25) (FIG. 9), according to an embodiment of the present invention.
Figure 11:
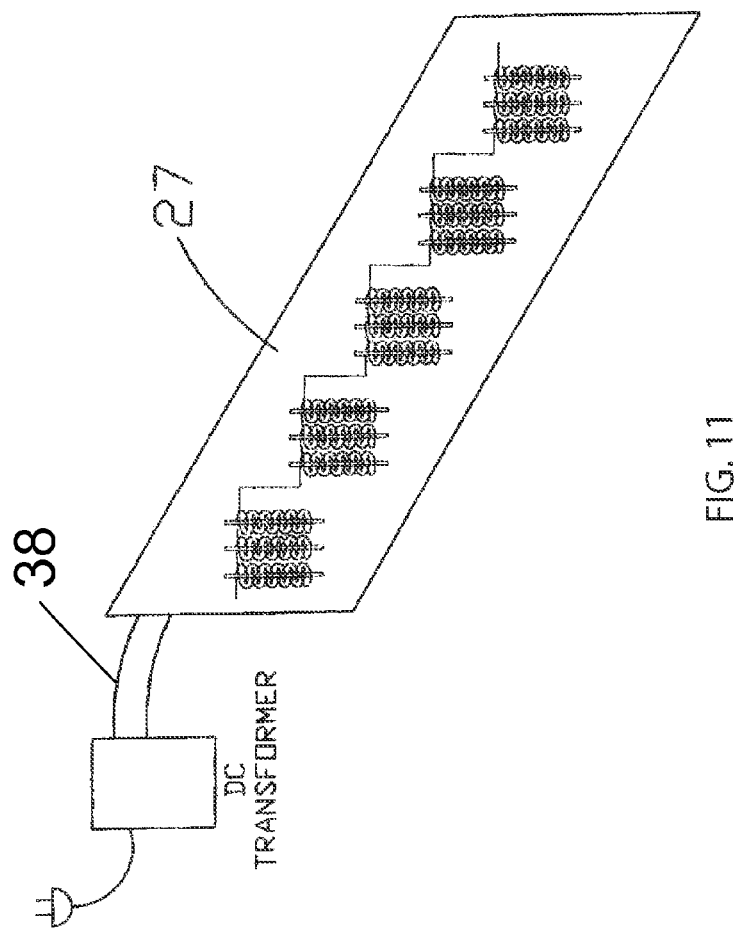
FIG. 11 is a perspective view of a plurality of wire-wrapped uncoated rods of FIG. 10 coated with a flexible non-conductive coating (27) according to an embodiment of the present invention.

In one aspect of the present invention, an apparatus comprises a plurality of rods (FIG. 4, FIG. 10) which are staggered in a progressive forward direction while progressing around the diameter of circular pipe (FIG. 18) enabling the frequency and magnetic field to cause a vortexing electromagnetic frequency field to react with any liquid substance inside the pipe (31) a multiple of times. The magnetic field (14, 28) must be significantly strong enough to overlap within the center of the pipe (31). The frequency and magnetic field is amplified by using a coating of natural or synthetic crystals of various sizes (FIG. 22) (51). The depth of the overlapping of the magnetic fields will help to determine the intensity of the reaction within the liquid flowing through the pipe. The strength of the frequency will be determined but not totally dependent upon the electrical flow (15) and magnetic field (14).

The magnetic field (14) and electrical flow (15) may be reversed depending upon the particular application. The magnetic field (14) will begin, but is not limited to, an industrial standard of south pole field (35) progressing forward to the north pole field (36) then continually moving forward to the next south pole field (35) continuing to progress with the direction of fluid flow. The magnetic fields are not limited to a specific number. This is determined by the size of pipe (31) and the fluid flowing through the pipe.

The bottom wire end (18) of the first rod is connected to the positive (37) line of a DC power supply; this supply should be converted from an alternating higher current to a direct current. The higher current to be converted may be but not limited to 120 volts, 240 volts, 440 volts, 50 or 60 cycle. The top wire end (19) of the first rod must be connected to the bottom wire end (39) of the adjacent rod; the top end of the wire (20) of the last rod must be connected to a negative line (38) of the DC power supply; a bottom end of the wire of the last rod (39) must be connected to the top end of the wire (40)

end of the previous adjacent rod; and each of the plurality of rods between the first rod and the last rod having top and bottom ends of wire connected to wire ends of each adjacent rod. All rods should be wrapped (FIG. 1) in the same design but does not need to be limited to the same number of coils (16) on the rod.

Figure 7:
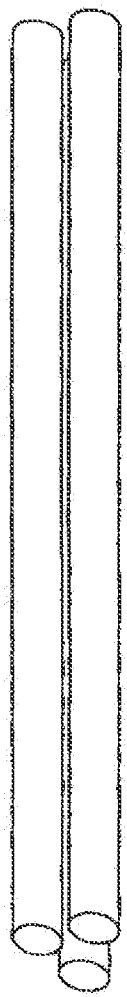
FIG. 7 is a view of three uncoated rods (13) (FIG. 2) stacked together without coils according to embodiment of the present invention.
Figure 8:
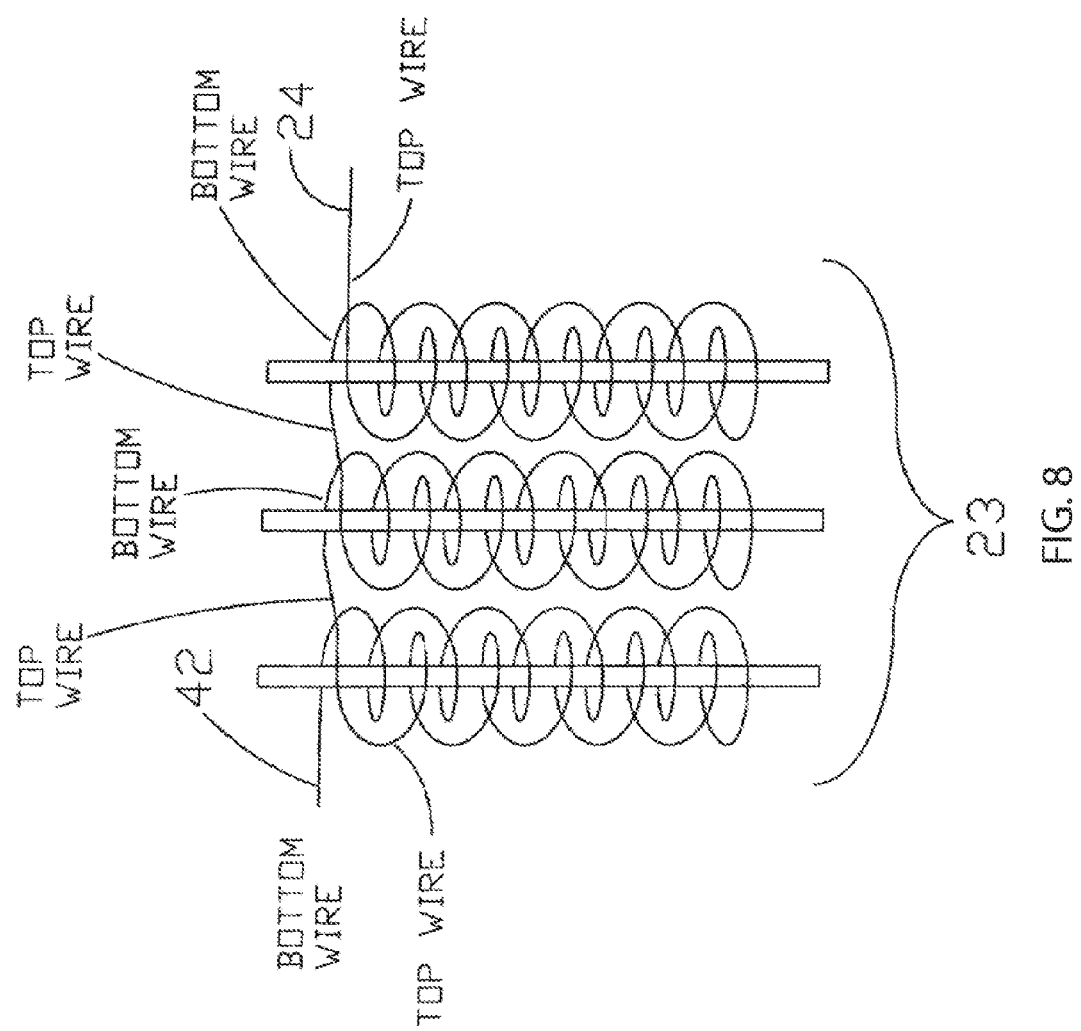
FIG. 8 is a view of three uncoated rods (13) (FIG. 2) stacked together with coils (23) wrapped around the three inner rods only with the connections (24) (FIG. 9) made in a series according to the embodiment of the present invention.

In another aspect of the present invention, an apparatus comprises of three of the above rods (FIG. 7) wrapped with wire (FIG. 1) to create coils (FIG. 8), assembled together in a triangular shape (FIG. 9) with all of the beginning wires and the ending wires terminating on the same end. The final wire coil is then rolled (FIG. 10) around the outside of the three coils that have been assembled in a triangular shape serving to hold the triangle together. The beginning and ending wires of this final outside wire coil must have the same beginning and ending of the other coils. For clarification, all the wrapped wires should be ending on the same end. The bottom wire of the first coil (41) is attached to the positive side of a DC transformer. The top wire of the first coil is attached to the bottom wire (24) of the second coil. The top wire of the second coil is attached to the bottom wire (42) of the third coil. The top wire of the third coil (43) is attached to this bottom wire of the coil rolled around the outside of the three of the coils that are triangular pattern. The top wire of the outside coil (25) will be attached to the bottom wire of the first coil of another set of stacked coils. The top wire of the outside coil of the last coil (44) will be attached to the negative side of the DC transformer. For clarity see FIG. 9 and FIG. 10. This aspect of the present invention may then be staggered around a pipe (FIG. 18) in a clockwise or counter clockwise direction depending upon the result desired. This configuration creates a intense multi-vibrational field.

In another aspect of the present invention, a method for generating a multi-vibrational electrical frequency with the electromagnetic field comprises of a moving DC current (FIG. 4) through a plurality of wire coils, each of the wire coils wrapped around a rod, each of the rods disposed substantially parallel while being staggered around the pipe (FIG. 18) in a clockwise or counter clockwise direction to each other.

In another aspect of the present invention, a method for generating a multi-vibrational electrical frequency attaching to the electromagnetic field comprises of a moving DC current through a plurality of wire coils, each of the wire coils wrapped around a rod, each of the rods disposed substantially parallel while being staggered around the pipe in a clockwise or counter clockwise direction with the first half of the coils facing the south pole (35) toward the water flow and the second half north pole (36) facing away the from the water flow.

In another aspect of the present invention, a method for generating a multi-vibrational electrical frequency attaching to the electromagnetic field comprises of a moving DC current which may be amplified with the attachment of various crystals, of varying sizes and shapes to the coils. Through a plurality of wire coils, each of the wire coils wrapped around a rod, each of the rods disposed substantially parallel while being staggered around the pipe in a clockwise or counter clockwise direction with the first half of the coils facing the south pole (35) toward the water flow and the second half north pole (36) facing away the from the water flow.

Figure 6:
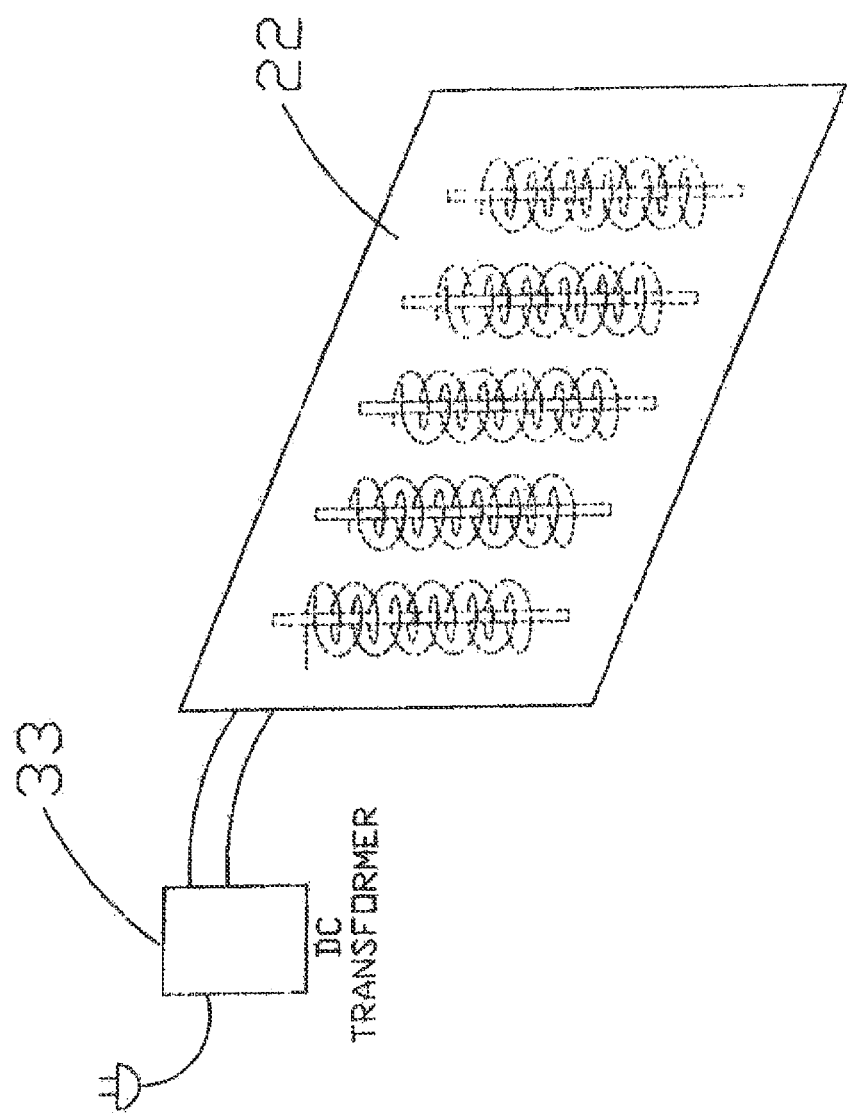
FIG. 6 is a perspective view of a plurality of wire-wrapped rods coated with a flexible non-conductive coating (22) according to an embodiment of the present invention.
Figure 12:
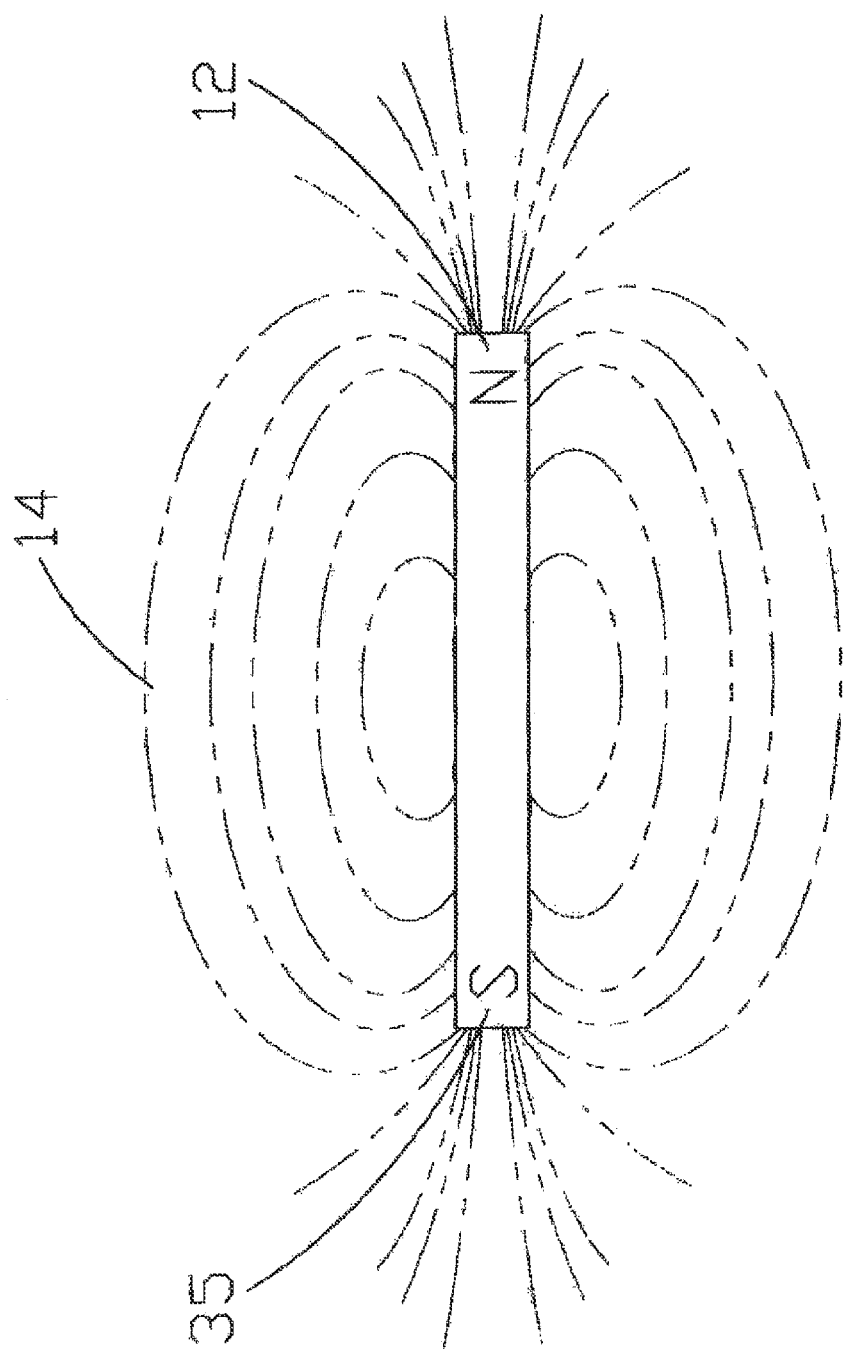
FIG. 12 is a perspective view of the electromagnetic Gauss field (14) generated by the apparatus of FIG. 3 according to an embodiment of the present invention.
Figure 13:
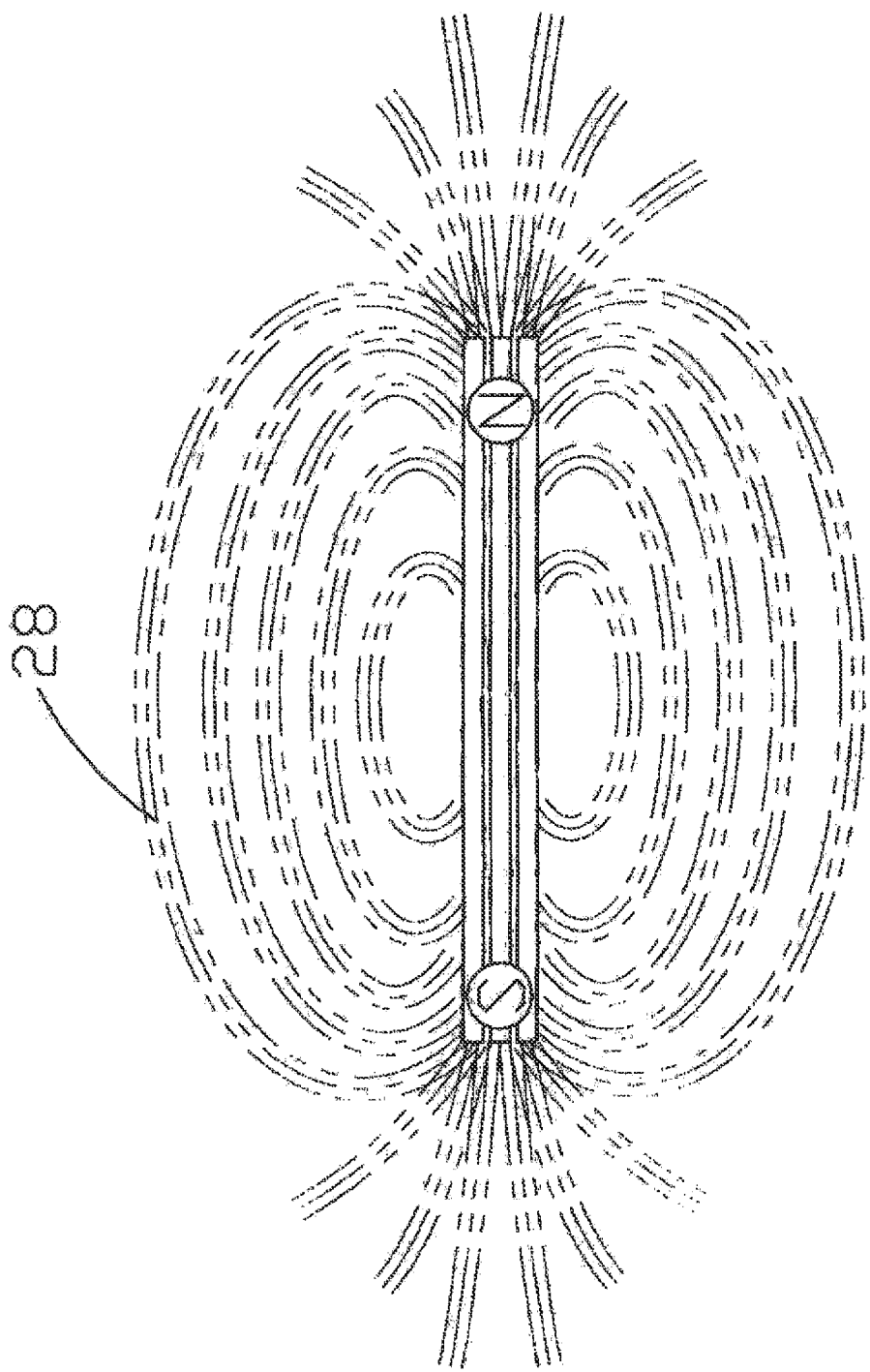
FIG. 13 is a perspective view of the electromagnetic Gauss field (28) generated by the apparatus of FIG. 8 according to an embodiment of the present invention.
Figure 14:
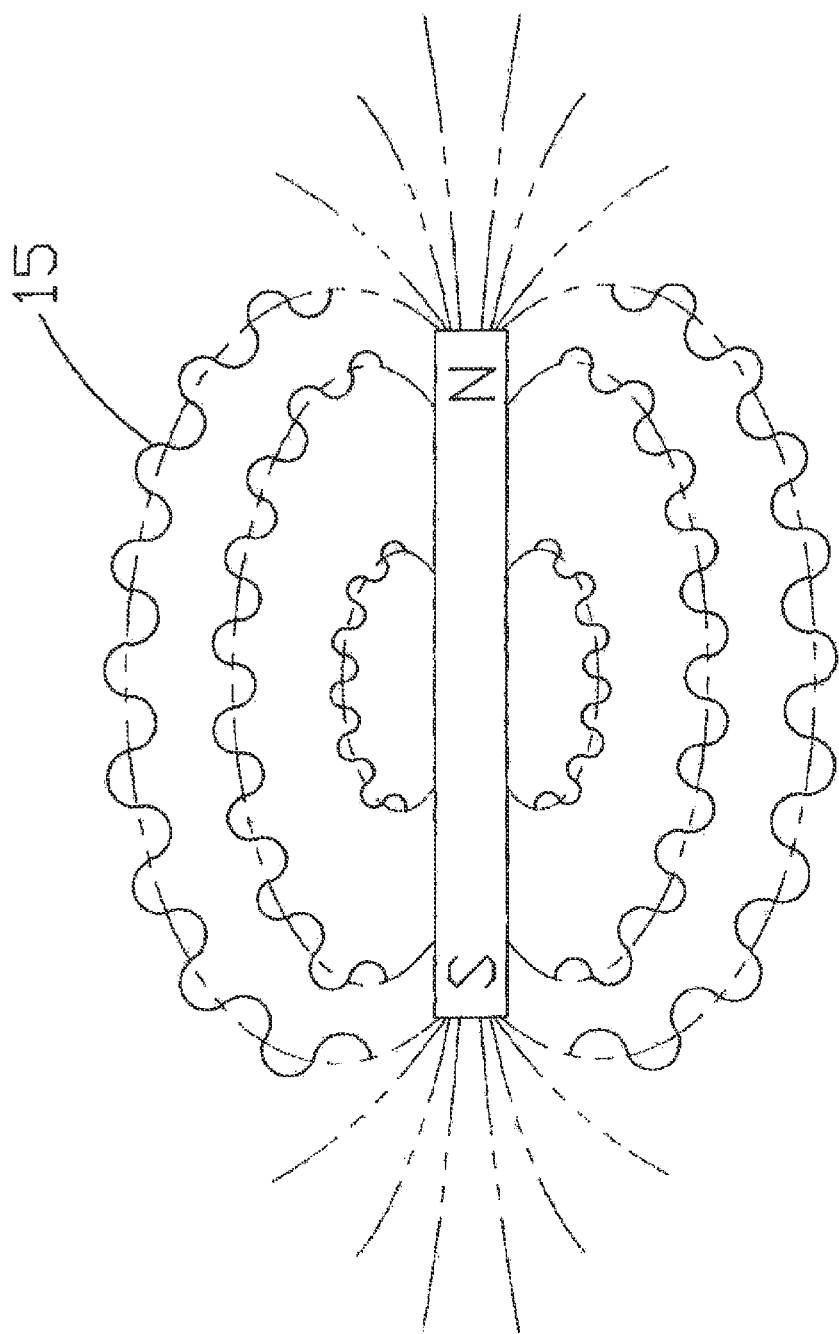
FIG. 14 is a perspective view of the electromagnetic Gauss field (14) (FIG. 12) with the electrical frequency (15) forming within the magnetic field of FIG. 12 generated by the apparatus of FIG. 3 according to an embodiment of the present invention.
Figure 15:
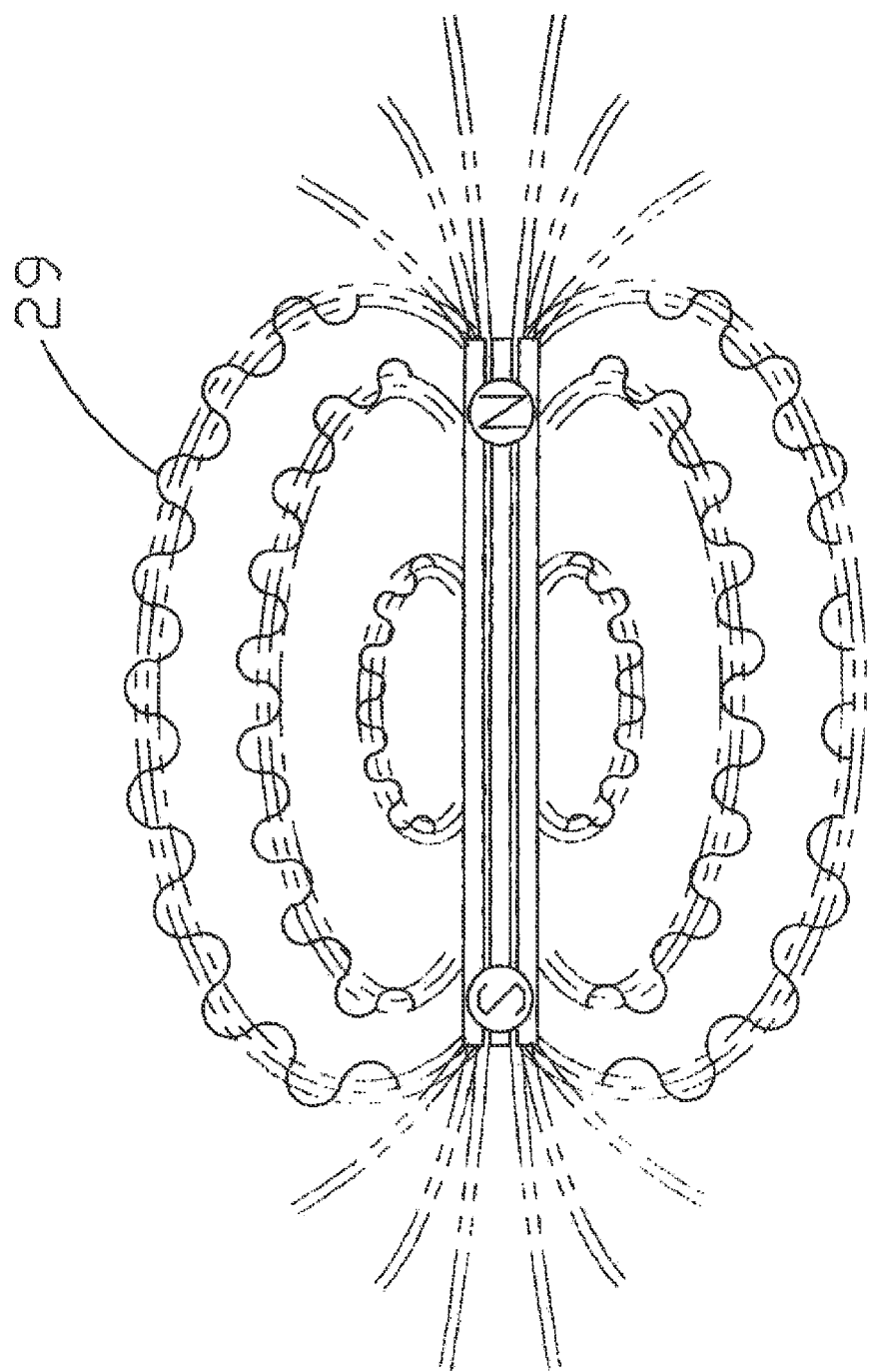
FIG. 15 is a perspective view of the electromagnetic Gauss field (28)(FIG. 13) with the electrical frequency (29) forming within the magnetic field of FIG. 13 generated by the apparatus of FIG. 11 according to an embodiment of the present invention.

In another aspect of the present invention, a frequency generating electromagnetic apparatus comprising of multi-vibrational fields being generated from a plurality of staggered and spaced apart elongated rods (FIG. 4) with opposing ends (FIG. 12), the rods totally covered with a non conductive coating (FIG. 6); wire wrapped around each of the plurality of elongated rods (FIG. 1), forming a plurality of coils connected in a staggered (FIG. 4) sequence to a power supply; a coating (22) covering the entire plurality of the coil assembly creating a flexible housing (FIG. 6) for containing the plurality of coils.

Figure 2:
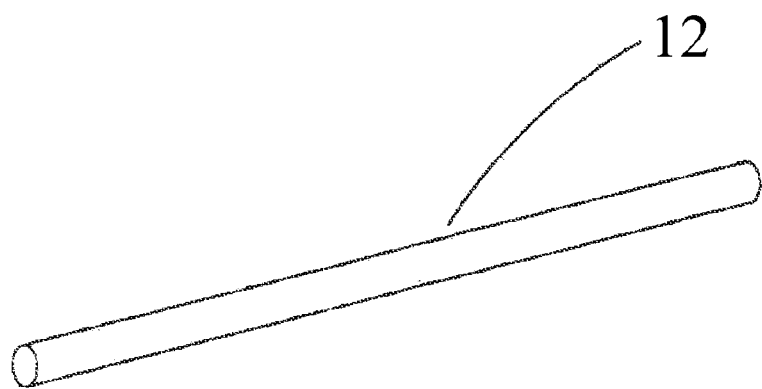
FIG. 2 is a side view of an uncoated rod (13) used in an embodiment of the present invention.

Referring to FIG. 2, the rods should be cut to the appropriate length (13) for a particular application (depending on size of pipe). The length (13) and diameter of the rod (45) may vary with its intended application and may be from about 2 inches to about 24 inches in length, typically from about 4 inches to about 12 inches. The rod (13) may have a diameter (45) that may vary with its intended application and may be from about 1/16 inch to about 1 inch, typically about 1/8 inch to about 1/2 inch. The rod (13) may be made from a specialized metal including but not limited to a rare earth metal, a plastic encasement holding a magnetic conductive material any other conductive metal, such as cold rolled steel.

Figure 3:
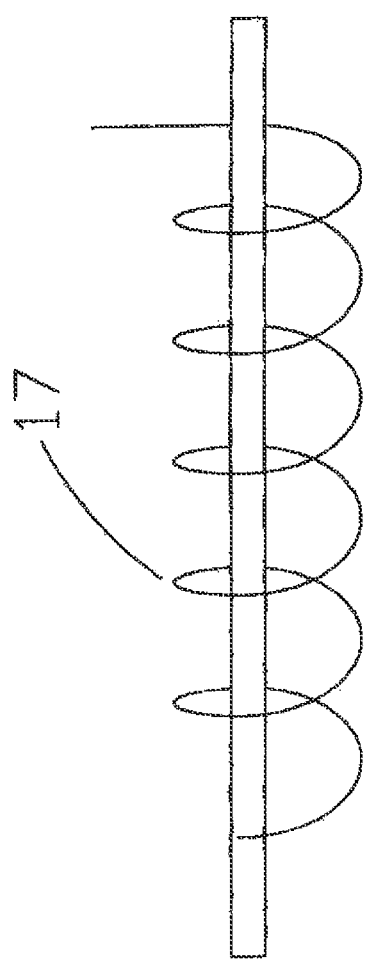
FIG. 3 is a side view of the uncoated rod (13) of FIG. 2 wrapped with one layer of wire, according to an embodiment of the present invention.
Figure 4:
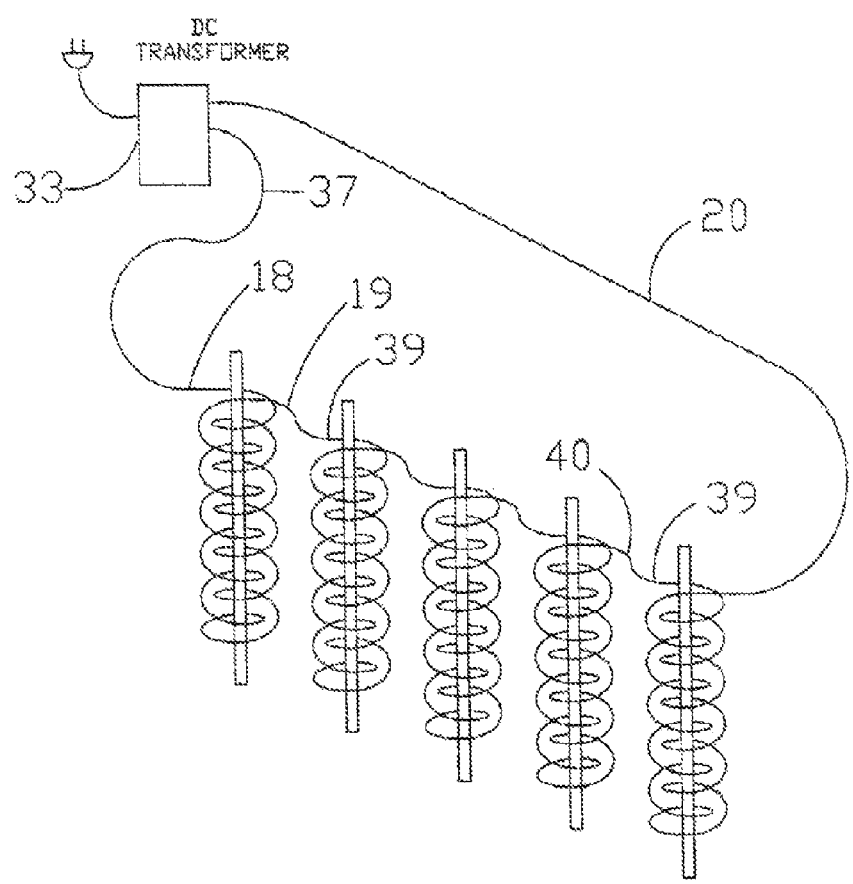
FIG. 4 is a perspective view of a plurality of the wire-wrapped rods of FIG. 1, connected in a staggered series, according to an embodiment of the present invention.
Figure 5:
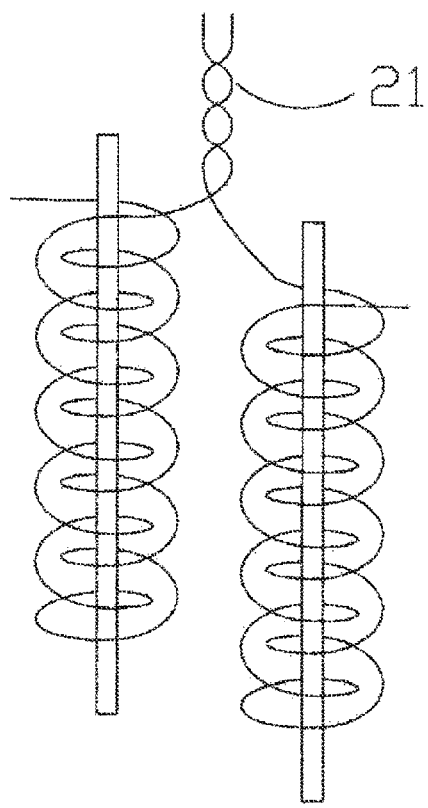
FIG. 5 is a close-up view of the connection (21) between adjacent coils, according to an embodiment of the present invention.

Referring to FIG. 2-3, the rod (13) should not be wrapped with a coating. The rod (13) may be wrapped with a conducting wire (17), such as a copper, gold, silver, magnetic wire. The wire (17) should wrap from one end of the rod leaving a small amount (FIG. 3), approximately 1/4 inch exposed on either end. The wire (16) may be doubled back on itself when reaching the opposite end a number of times depending upon the penetration depth needed for a particular application. The wire size may vary within the apparatus form coil-to-coil depending upon the frequency and the depth on the penetration needed for the application. The wire (16) may be but not limited to copper, gold, silver, or any other conductive metal or product. The wire (16) may but is not limited to a size between about 36 gauges to about 10 gauges. Typically it will be from about 28 gauges to about 18 gauges. Referring now to FIG. 4, a plurality of rods (1) may be wrapped with wire (16), as described above. The rods (16) may be laid out substantially staggered in a progressive fashion (FIG. 4) to each other or the rods may be bundled in groups of two, three (FIG. 9) or more with an outside coil wrapped around the bundled group. This configuration may have but not limited to one outside wrapping (24). These bundles should be staggered (FIG. 4, FIG. 10) in a similar spiraling fashion around the pipe (FIG. 18) in a clockwise or counter clockwise direction. The apparatus should be coated (22) with a protective coating. Typically, between 3 and 30 rods (12, 23) may be used, but more or less may be needed depending on the application. Normally between 5 and 20 rods (12, 23) are used. The spacing between the rods (12, 23) may be but not limited to, between 1/4 inch and about 2 inches. The number of rods (12, 23), the number of windings (16) on the rods (12), and the spacing between the rods (FIG. 4) may be a function of the intended use of the apparatus. For example, for calcium carbonate control applications will vary depend the size of the pipe (31) and the speed of the liquid flow. Also affecting the distance between rods (FIG. 4) is the contents within the liquid flowing in the pipe. The voltage and amperage of the DC electrical (33) input may affect the spacing (FIG. 4) between rods. Spacing for normal water treatment is approximately 1.5 inches at 6 volts with 1.75 amps. This will vary with the number of inches of wire (16) used to wrap the rod (17).

The apparatus should be used on a plastic, copper, or stainless steel pipe (31) only. A steel pipe will dissipate the effect of the water treatment. Once the liquid is treated then it may travel through a steel pipe unaffected.

Figure 16:
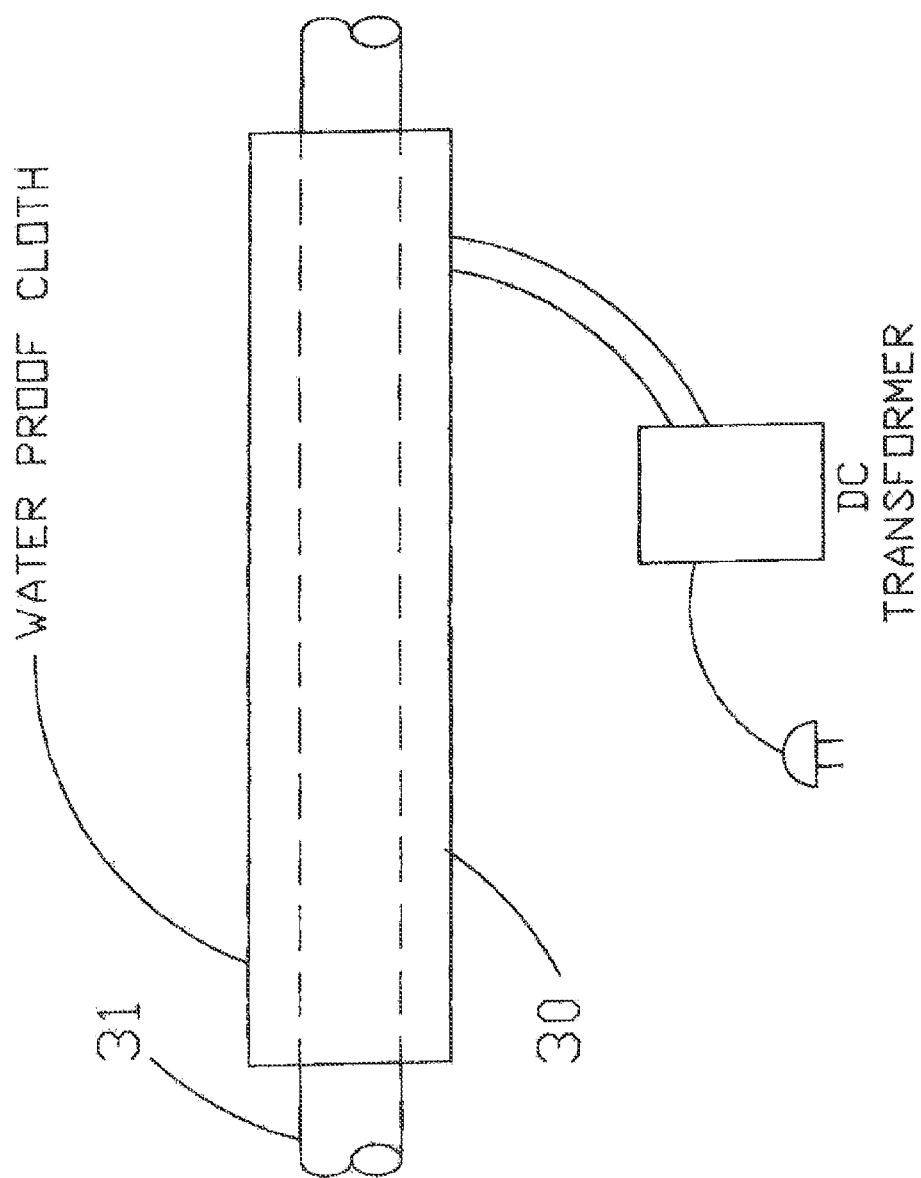
FIG. 16 is a perspective view of the apparatus of FIG. 6 and FIG. 11 covered with a waterproof covering (30) around a plastic pipe (31), according to an embodiment of the present invention.
Figure 17:
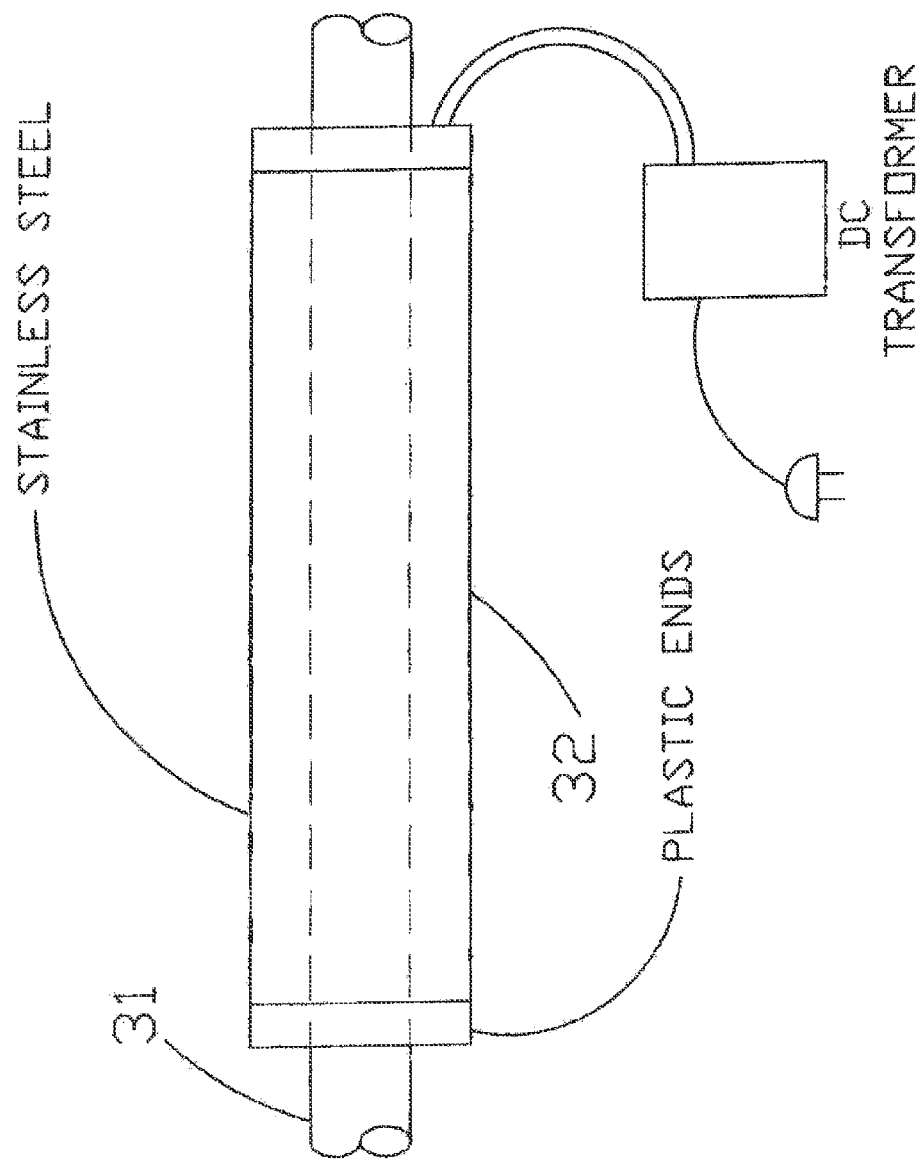
FIG. 17 is a perspective view of the apparatus of FIG. 6 and FIG. 11 covered in a stainless steel box (32) around a plastic pipe (31), according to an embodiment of the present invention.
Figure 19:
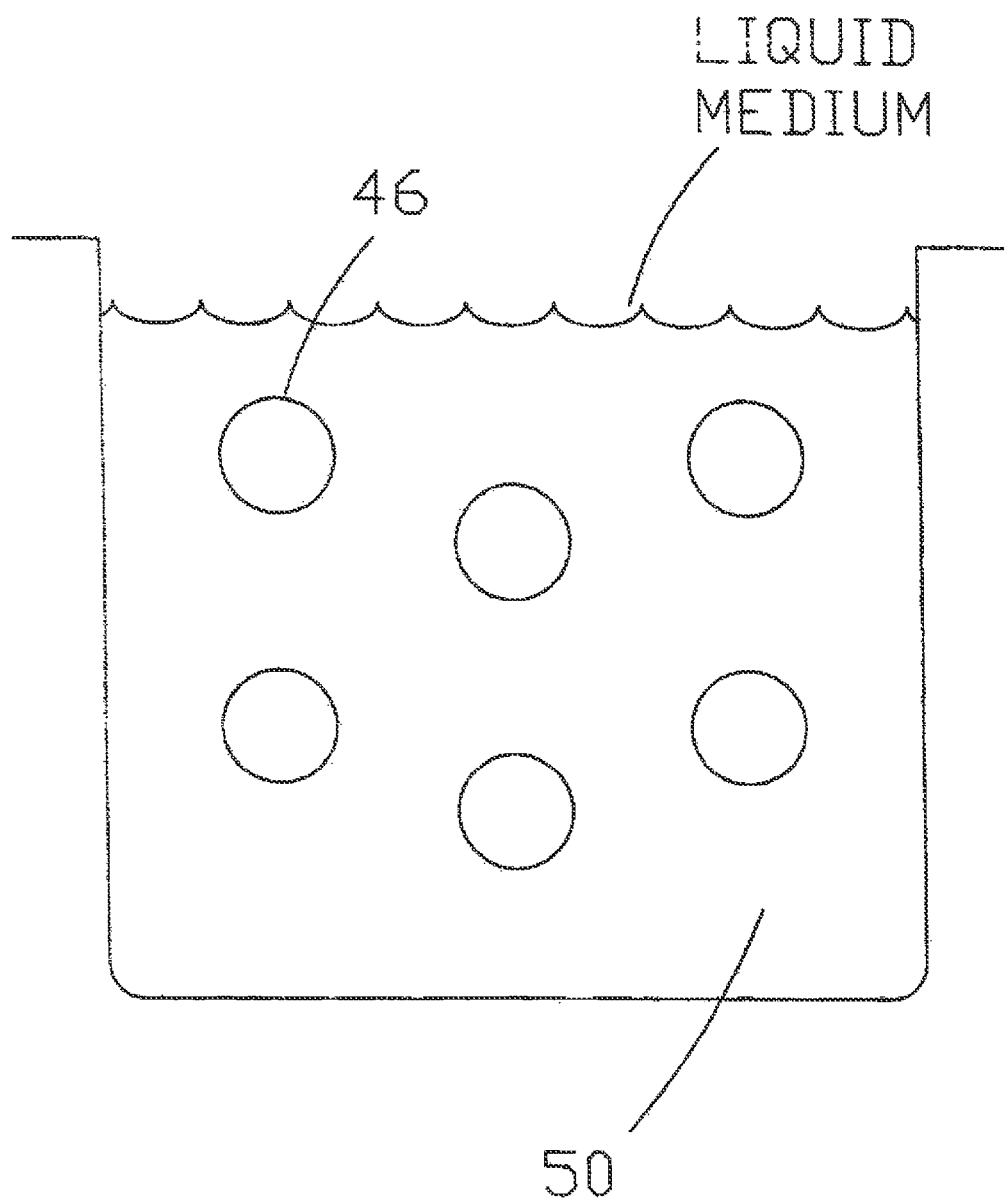
FIG. 19 is a perspective view of a trough/trench (50) with a liquid flowing in it with a number of apparatuses (46) mounted inside a number of plastic pipes being able to treat a liquid passing on the outside of the pipes, according to an embodiment of the present invention.

In another aspect of the present invention, the apparatus is installed (FIG. 16, FIG. 17) on the outside of the pipe (31) of the intended liquid it is intended to treat. For the treatment of very large flows of liquid (FIG. 19) such, but not limited to, as is used in electrical generating plants (example, water canals (46)) the apparatus may be mounted inside a plastic pipe (46). A number (FIG. 19) of these pipes (46) with coils (FIG. 4) may be installed in a fashion so the magnetic field creates an even energy field throughout the liquid being treated.

In another aspect of the present invention, the apparatus is installed on the outside (32) of the pipe (31) between (49) the return (from cooling tower) (47) and the supply (to the cooling tower) (48) lines of the intended liquid it is intended to treat in a cooling tower. A small amount of water will flow from the supply (48) to the return (47) through the unit. This being a closed loop system, is a significant amount of water to effect the treatment of the complete cooling tower system.

The apparatus has a major role in controlling the calcium, scale, bacteria, algae removal and buildup in industrial cooling towers. Bacteria counts have been commonly measured at below 400 cfu/ml. Many cooling towers using a chemical treatment will only be able to achieve one to three cycles before new water must be introduced into the system. A major savings in water usage with a count of ten or more cycles is easily achieved using the apparatus resulting in millions of gallons of water saved. The total use of chemical treatment in cooling towers is no longer needed.

Figure 20:
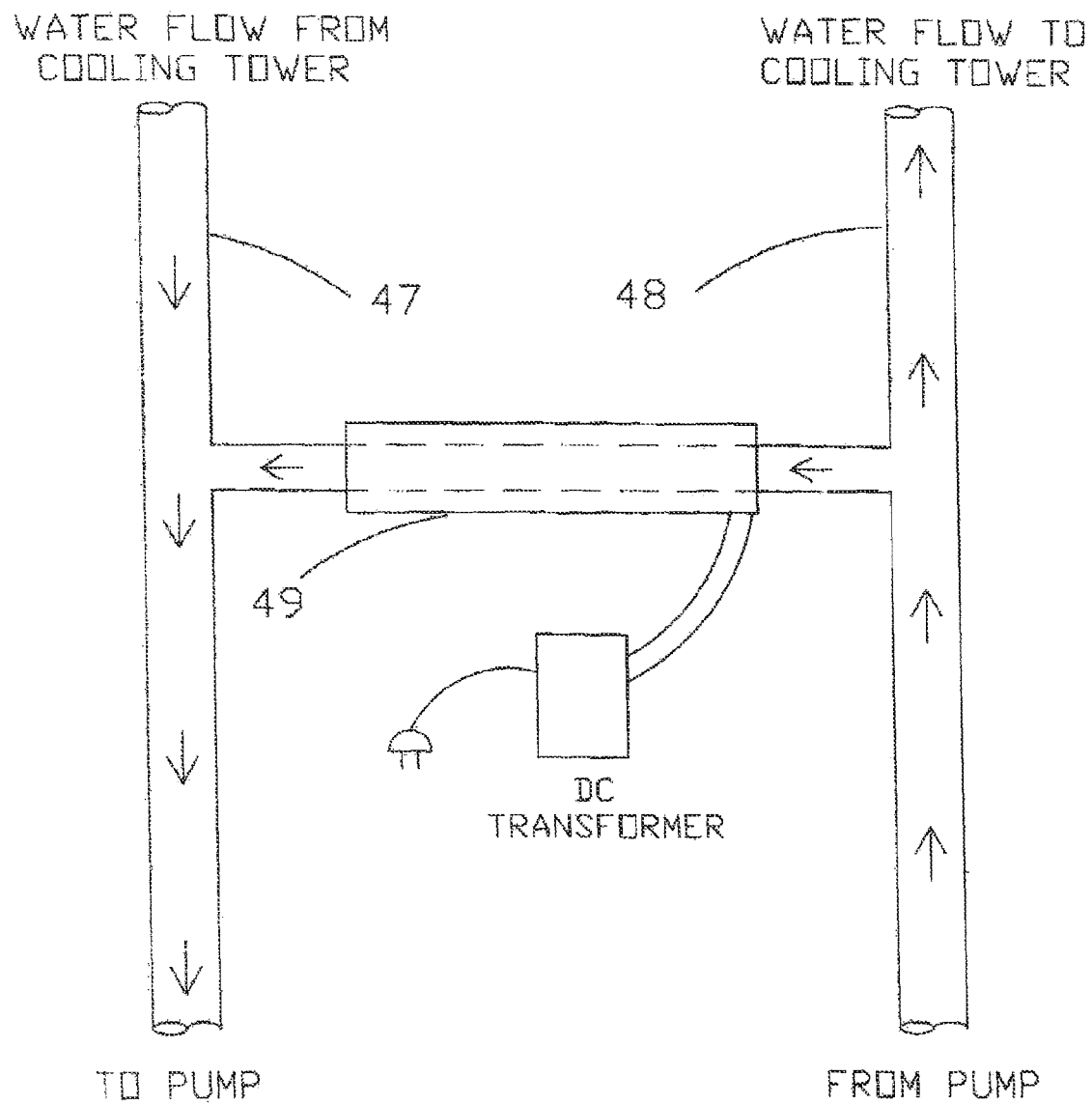
FIG. 20 is a perspective view of the apparatus (49) of FIG. 17 installed in a piping configuration of a cooling tower, with directional (47, 48) flows noted, around a plastic pipe (31) (FIG. 16), according to an embodiment of the present invention.
Figure 21:
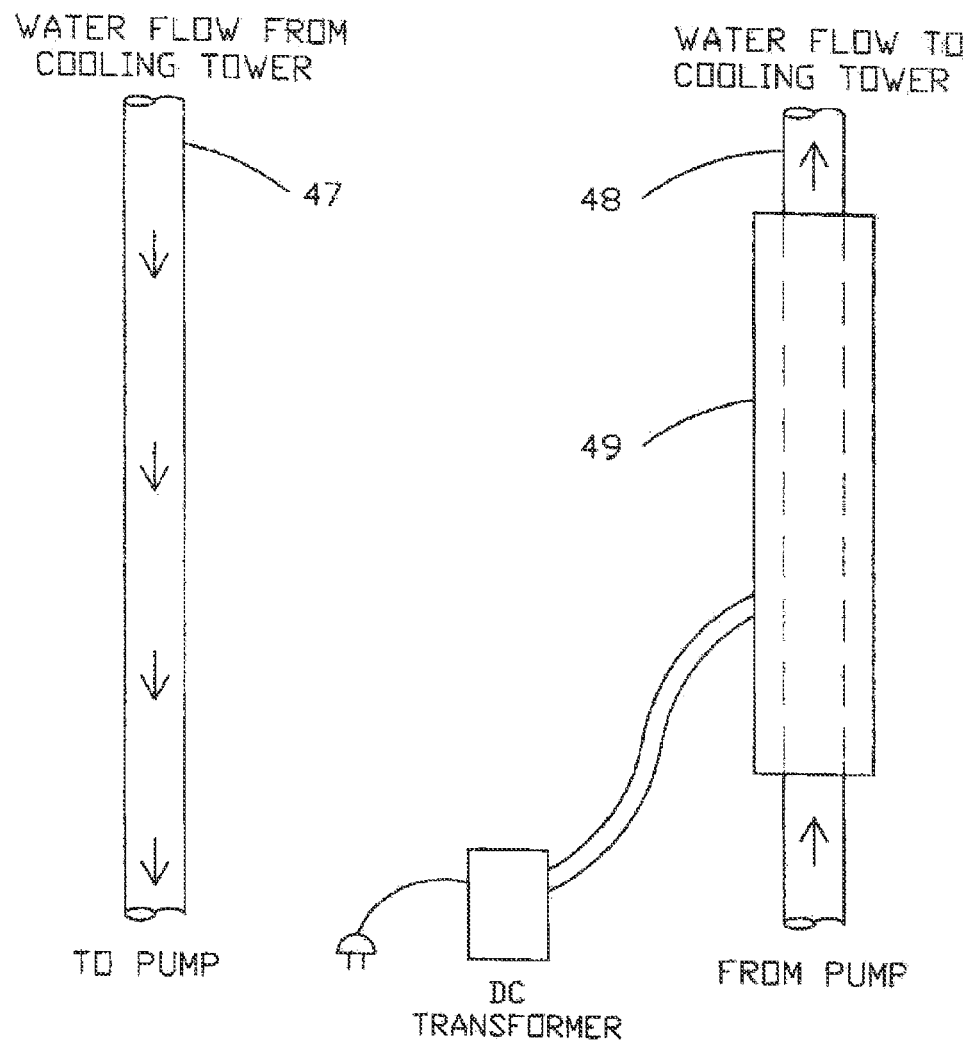
FIG. 21 is another perspective view of the apparatus (49) (FIG. 20) of FIG. 17 installed in a piping configuration of a cooling tower, with directional (47, 48) (FIG. 20) flows noted, around a plastic pipe (31) (FIG. 16), according to an embodiment of the present invention.

The treatment of water in cooling towers or other bodies of water in a contained circulating system may be achieved by treating the complete flow (FIG. 21) of the liquid or by using only a side slip method (FIG. 20) treating only a small portion at a time. It has shown through bacteria counts (under 400 cfu/ml) that the whole system is affected. It was observed that scale and calcium build up disappeared (in less than 30 days) with a sideslip as fast as it did when the total amount of water traveling through the pipe was treated.

The apparatus (FIG. 16, FIG. 17) may be used to control calcium and mineral buildup in cooling towers boilers, chillers, evaporate coolers, plumbing fixtures and other equipment without chemical use.

For reducing existing and new buildup of calcium and other minerals the apparatus may be wrapped (FIG. 16, FIG. 17) around a main water line (31) supplying the building or the area to be treated. Such a system may reduce or prevent calcium and mineral buildup in all areas where the liquid comes in contact with a surface.

This system may also reduce the amount of soap for laundry from about 1 cup to about ⅛ cup. The cleaning time in areas of normal mineral buildup may be drastically reduced.

Water softener salt reduction may be achieved by wrapping (FIG. 16, FIG. 17) the apparatus around a water pipe (31) before it enters the softener. The salt settings may then be reduced by about 50% or more. Field testing has shown a 70% reduction in salt usage while maintaining 0 to 4 grains of water hardness.

By wrapping the apparatus (FIG. 16) around a circulating line of a swimming pool, chlorine usage was reduced by 66% while still maintaining the required standard chlorine levels. New calcium scale build-up was prevented, water clarity was improved and algae growth was inhibited.

While not relying on any single mode of operation of the present invention, the vibrating magnetic resonating frequency vortexing field apparatus may use frequencies (15, 29) superimposed on a magnetic field to restructure chemicals, minerals and water molecules. The structuring of the liquid becomes stable with an observed shelf life in excess of four months before changes occur. The transferring of the structured liquid through a steel or galvanized pipe seems to have no effect on the structuring of the liquid.

Through the use of a magnetic field (14, 28), the molecules may not only align but also break into smaller grouping causing a change in the surface tension of the liquid. The apparatus may use a pulsing electrical frequency (15, 29) superimposed or combined with a magnetic field (14, 28) to align the molecules in a uniform or scattered directional field. With the physical changing of calcium carbonate to calcium bicarbonate the saturation point becomes over 10,000 times to one higher. The calcium bicarbonate in the water may retain its solvency as long as a liquid form is maintained and may not allow minerals to revert back to form a hard crystal scale. The electromagnetic field (14, 15, 28, 29) generated by the apparatus (FIG. 16, FIG. 17) may move with the vortex flow of the water, aligning the molecules and changing the calcium of the complete liquid. By treating the water and the calcium, the water may cause a reaction with the bacteria and algae causing a die off effect of them. This treatment will also not allow the calcium to bond in pipes, on fixtures, in water heaters, or on glass or tile.

EXAMPLES

Example 1

A water boiling and steam temperature test was conducted. Identical glass pots, water source and amount of water were used. The stove is new and the heating elements are the same size. The temperature of the city water at a full boil was 210 degrees Fahrenheit. The temperature of the treated city water was 180 degrees Fahrenheit at a full boil. All conditions being equal, at a full boil the steam of the treated water was 10 degrees hotter than the city untreated water steam. The treated water created hotter steam; however the untreated city water boiled away twice as fast as the treated water. The test was repeated swapping pans and heating elements with the same results as previously observed.

Example 2

Examples of industrial use in cooling towers shows a small Imeco cooling tower tied to a closed loop refrigeration system blowing down at one and one half cycles was using in excess of 22,000 gallons of water per year. At this setting a scale of approximately ½ inch thick on the bottom of the tower was observed even with the use of chemicals in the tower. The fill had a visible amount of calcium buildup on it. The apparatus was installed, all chemicals removed, and the cycle setting set fifteen After one month all of the buildup on both the bottom and fill disappeared. Also the bacteria count was reduced to less than 100 colony-forming units per milliliter (cfu/ml) as tested by an outside-certified lab. This is less than 1/100 of the Cooling Tower Institute maximum recommendation of 10,000 cfu/ml. After six months of operation and monthly bacteria test, the tower is still clean and bacteria counts are still minimal with no additional maintaince required. The water is clear, with no odor, no algae, no scale, a pH of 8.9 and the conductivity set at 2010. A water savings of 1,808,000 gallons per year was achieved. A savings of $12,423.00/year total savings was achieved.

Example 3

Examples of industrial use in cooling towers shows two BAC cooling towers tied to two Trane 125 Ton Chillers, blowing down at 2.3 cycles, using in excess of 4,000,000 gallons of water per year. At this setting a heavy scale on both the bottom and sides of the tower and on the fill was observed even with the use of chemicals in the tower.

Various plants and algae were growing on both the sides and on the top of the tower. Visible deterioration of metal components was evident due to the use of chemicals. The apparatus was installed, all chemicals removed, and the cycle setting adjusted from 2.3 to 5. After one month all scale and algae build up on both the bottom, sides and fill disappeared. The bacteria count was reduced to less than 100 colony-forming units per milliliter (cfu/ml) as tested by an outside certified lab. This is less than 1/100 of the acceptable Cooling Tower Institute maximum recommendation of 10,000 cfu/ml. After six months of operation and monthly bacteria test, the tower is still clean and bacteria counts are still minimal with no additional maintenance required. The water is clear, with no odor, no algae, no scale, a pH of 8.9 and the conductivity set at 2010. The apparatus eliminated using 1,195,000 gallons per year and created a savings of $10,211.00 per year in water cost.

Example 4

A significant difference in plant growth was observed in a 16-day test. Two 25 gallon planting tubs were filled with garden soil purchased at Lowe's Home Center. An 8 pack of tomato plants were also purchased at the same time and split between the two tubs. One tub was watered with city water and the other tub was watered using the same city water, only treated with the apparatus. A notable difference in height, number of branches, leaves and color was observed after 4 days. Photos were taken every two days. After 16 days the test was stopped because the plants being watered with untreated city water were failing to thrive. The plants getting treated city water, using the apparatus were flourishing, with many blooms and very small tomatoes in about two weeks time.

Example 5

A test with a large PORTA COOL evaporative cooler was conducted in the month of June of 2010, with a humidity of approximately 60%. Testing of the untreated incoming city water showed a measurement of 565 microsiemens. Using this untreated city water at 565 microsiemens, the scale buildup began at 750 microsiemens which is 1 and ½ cycles. The apparatus was attached to the line feeding the fill material inside the unit. When treatment was started the scale buildup disappeared. For further testing, pieces of copper, steel, iron, rusty nails and plastic were placed in the bottom of the PORTA COOL. As the microsiemens steadily increased, there was no noticeable change or deterioration in any of the products with the exception of the rusty nails. These nails became shiny and looked almost new. The microsiemen count increased after one week to 25,000 with no buildup of scale observed. At 25,000 microsiemens, with the ambient temperature in the high 80's (F), the water temperature in the PORTA COOL was in the low 50's (F). In addition, the incoming air and outgoing air differential was in excess of 25 degrees F. with an appreciable difference in humidity, creating a very cool feeling to anyone standing in the outgoing airflow. This unit cooled a double car garage that has no insulation and is always very hot and humid during the months of June and July.

Example 6

Leaf lettuce was purchased from a local grocery store. One half was washed in city water, drained and placed in a plastic container with the lettuce standing upright to allow for drainage. The other half was handled the same except it was washed in treated city water, using the apparatus. Both containers were placed in the refrigerator with a paper towel in the bottom to absorb the excess water. After four days the untreated lettuce began to wilt and the edges of the lettuce were starting to turn brown. The treated lettuce still had very small water droplets attached to the surface of the leaves and the lettuce actually appeared greener and fresher than it had at the time of purchase. After four months the treated lettuce was removed from the refrigerator, it was still crisp with droplets still on the surface of the leaves. There was no wilting or discoloration. The lettuce still tasted crunchy and fresh.

Example 7

An outdoor swimming pool was left unattended over the winter in 2010 in West Virginia. In May of 2010, it was murky and green with a ring of white on the edge of the pool at the top of the water level and there were brown spots on the bottom. The circulating pump was turned on and the apparatus was placed on the circulating water line after the pump. The pool had a bag filter in the system, and a new bag was placed in the filter. After four days and many, bag cleanings, the pool was crystal clear. Even the brown spots in the bottom were gone. The white hard water calcium around the water level edge wiped off easily with a sponge. The water tested fine with a completely negative bacteria count on the tests that we ran. This same test was repeated by an outside-certified lab to verify our results. The pool maintained clarity and bacteria growth control through the summer with minimal care. Two families including a number of children used the pool.

Example 8

A residential house with a city water hardness of 60 grains, installed the apparatus on the incoming water line. This residence also had a water softener. At that time the salt setting on the water softener was reduced by 75%. The homeowner claimed the water felt softer after adding the apparatus and reducing the salt by 75%. He also noticed a further reduction in soap use and scum and scale build up on the showerheads and faucets.

Example 9

In use with patent pending Title: FUEL ADDITIVE APPARATUS, SYSTEM AND METHOD (430pa309) a coil on a steel rod was used to create a magnetic field for the use of helping to separate a water molecule using electrolysis. While 1 coil showed a change the complete apparatus on a re-circulating loop with the electrolyte passing through it made a much greater change in the amount of gas produced.

Although the invention has been explained in relation to its preferred embodiment, it is to be understood that many other possible modifications and variations can be made without departing from the spirit and scope of the invention as hereinafter claimed.

What is claimed is:

1. An Apparatus for Creating a Vortex System comprises,
a plurality of rods;
a plurality of wire wraps;
a flexible non-conductive coating;
a dc power supply;
a circular pipe;
a water pipe;
each rod of the plurality of rods having a top end and a bottom end;
each wire wrap having a top wire end and a bottom wire end;

the dc power supply comprises a negative line and a positive line;

each wire wrap comprising a wire which is coiled and wrapped around each rod from the top end to the bottom end and back up to the top end;

the top wire end and the bottom wire end being extended from the top end of each rod;

the plurality of rods being enveloped by the flexible non-conductive coating;

the plurality of rods being encased by a housing, wherein the housing is flexible or metal;

the plurality of rods being peripherally positioned in parallel relationship about the circular pipe; and the circular pipe being concentrically wrapped about the water pipe, wherein the DC power supply provides power to the wire wraps around each rod; the plurality of rods include a first rod and a last rod; the plurality of rods being coated with a crystal coating, wherein the crystal coating may be natural or synthetic crystals of various sizes and causes an increase in the magnetic high frequency fields; the plurality of rods being arranged in parallel relationship to each other in staggered positioning; the top wire end being attached to the bottom wire end between adjacent rods; the top wire end of the first rod being connected to the negative line; and the bottom wire end of the last rod being connected to the positive line.

2. The Apparatus for Creating a Vortex System as claimed in claim 1 comprises,
the apparatus resulting in a structural change in water molecule groupings, and the water molecule groupings causing a change in water surface tension.

3. The Apparatus for Creating a Vortex System as claimed in claim 1 comprises,
wherein calcium carbonate in water passing through the water pipe to be chemically altered to become calcium bicarbonate.

4. The Apparatus for Creating a Vortex System as claimed in claim 1 comprises,
the plurality of rods being rods having a length from 4 inches to 10 inches and having a diameter from $\frac{1}{8}$ inch to $\frac{1}{2}$ inch.

5. The Apparatus for Creating a Vortex System as claimed in claim 1 comprises,
the plurality of wire wraps being made from a material selected from the group consisting of copper, silver and gold.

6. The Apparatus for Creating a Vortex System as claimed in claim 1 comprises,
wherein the DC power supply is converted from AC, and the DC power supply outputs 3 to 40 volts at 1 to 10 amps.

7. An Apparatus for Creating a Vortex System comprises,
a plurality of rod groups;
a plurality of wire wraps;
a flexible non-conductive coating;
a dc power supply;
a circular pipe;
a water pipe;
the plurality of rod groups comprises a plurality of rods;
each rod of the plurality of rods having a top end and a bottom end;
each wire wrap having a top wire end and a bottom wire end;
the dc power supply comprises a negative line and a positive line;

each wire wrap comprising a wire which is coiled and wrapped around each rod from the top end to the bottom end and back up to the top end;

the top wire end and the bottom wire end being extended from the top end of each rod;

the plurality of rods being enveloped by the flexible non-conductive coating;

the plurality of rods being encased by a housing, wherein the housing is flexible or metal;

wherein the plurality of rods include a first rod and a last rod;

the plurality of rods being coated with a crystal coating, wherein the crystal coating is a natural crystal or a synthetic crystal;

the plurality of rods being arranged in parallel relationship to each other;

the plurality of rod groups being positioned in a staggered and parallel relationship to each other about the circular pipe;

the top wire end being attached to the bottom wire end between adjacent rods;

the top wire end of the first rod being connected to the negative line; and the bottom wire end of the last rod being connected to the positive line.

8. The Apparatus for Creating a Vortex System as claimed in claim 7 comprises,
the circular pipe being concentrically wrapped about the water pipe, wherein the DC power supply provides power to the wire wraps around each rod; and
calcium carbonate in water passing through the water pipe to be chemically altered to become calcium bicarbonate.

9. The Apparatus for Creating a Vortex System as claimed in claim 7 comprises,
the plurality of rods being rods having a length from 4 inches to 10 inches and having a diameter from $\frac{1}{8}$ inch to $\frac{1}{2}$ inch.

10. The Apparatus for Creating a Vortex System as claimed in claim 7 comprises,
the plurality of wire wraps being made from a material selected from the group consisting of copper, silver and gold.

11. The Apparatus for Creating a Vortex System as claimed in claim 7 comprises,
the DC power supply being converted from AC, and the DC power supply outputs 3 to 40 volts at 1 to 10 amps.

12. An Apparatus for Creating a Vortex System comprises,
a plurality of rods;
a plurality of wire wraps;
a flexible non-conductive coating;
a dc power supply;
a circular pipe;
a water pipe;
each rod of the plurality of rods having a top end and a bottom end;
each wire wrap having a top wire end and a bottom wire end;
the dc power supply comprises a negative line and a positive line;
each wire wrap comprising a wire which is coiled and wrapped around each rod from the top end to the bottom end and back up to the top end;
the top wire end and the bottom wire end being extended from the top end of each rod;
the plurality of rods being enveloped by the flexible non-conductive coating;
the plurality of rods being encased by a housing;

wherein the plurality of rods include a first rod and a last rod;

the plurality of rods being coated with a crystal coating, wherein the crystal coating is a natural crystal or a synthetic crystal;

the plurality of rods being arranged in parallel relationship to each other in staggered positioning;

the top wire end being attached to the bottom wire end between adjacent rods;

the top wire end of the first rod being connected to the negative line;

the bottom wire end of the last rod being connected to the positive line;

the plurality of rods being peripherally positioned in parallel relationship about the circular pipe; and the circular pipe being concentrically wrapped about the water pipe, wherein the DC power supply provides power to the wire wraps around each rod.

13. The Apparatus for Creating a Vortex System as claimed in claim 12 comprises, calcium carbonate in water passing through the water pipe to be chemically altered to become calcium bicarbonate.

14. The Apparatus for Creating a Vortex System as claimed in claim 12 comprises, the plurality of rods being rods having a length from 4 inches to 10 inches and having a diameter from ⅛ inch to ½ inch;

the plurality of wire wraps being made from a material selected from the group consisting of copper, silver and gold;

the DC power supply being converted from AC; and the DC power supply outputting 3 to 40 volts at 1 to 10 amps.

\* \* \* \* \*